April 17, 1962 R. K. PHILLIPS ET AL 3,030,610

MAGNETIC CORE CIRCUIT

Filed Nov. 21, 1960

INVENTORS
R. KENNETH PHILLIPS
EDWARD E. CLARKE
BY George Baron
ATTORNEY

United States Patent Office 3,030,610

Patented Apr. 17, 1962

3,030,610
MAGNETIC CORE CIRCUIT

Robert K. Phillips, Philadelphia, Pa., and Edward E. Clarke, New York, N.Y., assignors to International Business Machines Corporation, New York, N.Y., a corporation of New York Filed Nov. 21, 1960, Ser. No. 70,684
3 Claims. (Cl. 340—174)

This invention relates to magnetic core switching circuits generally, and more particularly to an automatic resetting switching circuit.

It is often desirable to employ bistable magnetic cores having substantially square hysteresis loop characteristics as memory elements in computer technology. It is also desirable to employ a single interrogating pulse to sense the state of such cores in an array, transfer the information read out of such cores to another utilization circuit, and return all the switched cores to the same remanent state. It is desirable to obtain such return to the same remanent state with a minimum number of components and with as many passive elements as possible, to avoid energy losses in the driving and transfer circuits. Such return to the same remanent state for each core is of special utility in a logic circuit wherein a specific sequence of events is desired, e.g., a number of cores must be switched only after a preselected group of cores have been set.

Consequently, it is an object of this invention to obtain a novel readout circuit for magnetic cores.

It is a further object to obtain such novel readout circuit employing passive elements.

It is yet another object to obtain a readout circuit that is not sensitive to variations in pulse widths employed in driver circuits that are used to obtain such readout.

It is another object to obtain a readout for magnetic cores in an array wherein each of the cores in the array is automatically returned to the same remanent state.

The foregoing and other objects, features and advantages of the invention will be apparent from the following more particular description of preferred embodiments of the invention, as illustrated in the accompanying drawings.

Figure 1:
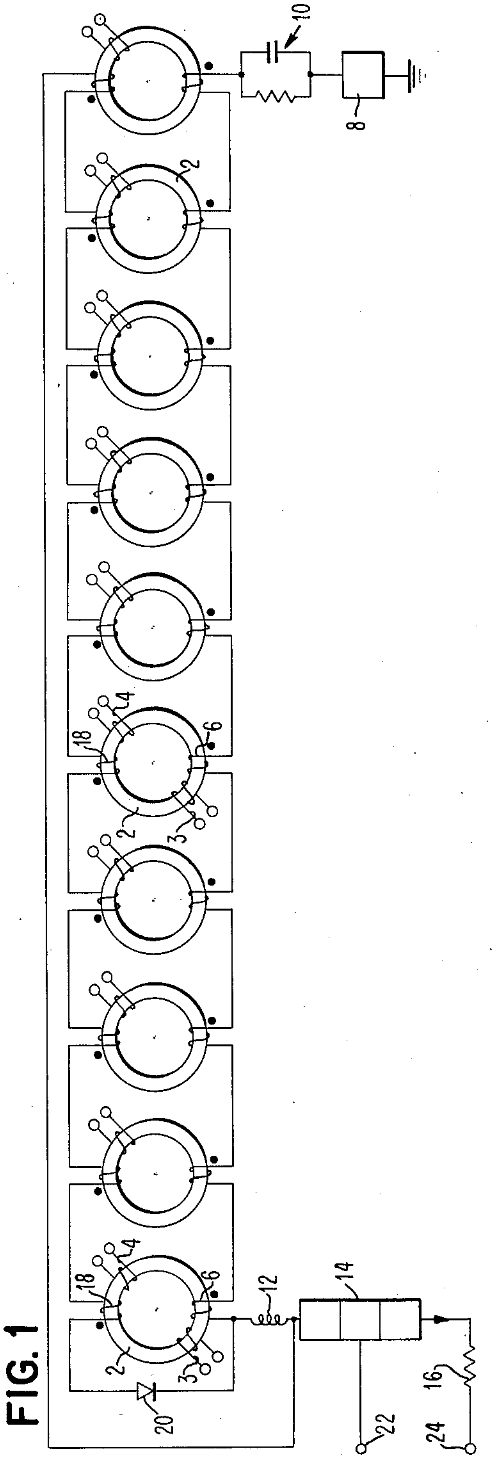
FIG. 1 is an embodiment of the invention in schematic form.

FIG. 1 shows an array of magnetic cores 2, such cores being of the ferromagnetic type having substantially square loop hysteresis characteristics, wherein such array could be part of a register, a logical circuit or means for storing command signals. Each core 2 will have an input winding 4 associated therewith so that current of a positive polarity sent through such input winding 4 will set its associated core 2 to the positive remanent state and current of a negative polarity through such input winding 4 will set its associated core 2 to the negative remanent state. The aforementioned remanent states may be considered respectively as a binary "1" or a binary "0," such notations being conventional in binary computer technology. Signals on input windings 4 select which cores 2 in the array will be set to the "1" state. Each core 2 also includes a read or interrogating winding 6 which is in series with a driving circuit comprising voltage source 8, filter network 10, inductor 12, transistor 14, and current limiting resistor 16. Each core 2 also has a third winding 18 thereon, which winding 18 acts as a read-in winding for its associated core. Each read-in winding 18 is in series circuit with diode 20 and inductor 12. A read-out winding 3 is a fourth winding on each core, and such winding 3 will produce an output pulse at its terminals for use in an appropriate utilization circuit when core 2 is switched from one state to another.

A diode in series with output winding 3 will permit polarized sensing of switched cores.

Transistor 14 is biased to cut-off by pulses applied to terminal 22, the polarity of the biasing pulse depending upon the type of transistor 14 that is used. If transistor 14 is of the P-N-P type then biasing pulses appearing at terminal 22 would be positive for cut-off and negative to turn the transistor on. When the transistor 14 is biased to conduct, input pulses are applied at terminal 24 to apply driving pulses to read windings 6.

Operation of FIG. 1 will now be described: When the driver circuit for the array of cores 2 is to be actuated, a pulse or D.C. level is applied to terminal 22 to trigger the transistor 14 into conduction and at the same time a negative input pulse appears at terminal 24 to cause current to flow through the read windings 6 of all the cores in the array. Current in such read windings 6 will drive all cores in the array toward their respective "0" states so that any core 2 that was in a "1" state prior to the application of interrogating $I_c$ current will switch to its respective "0" state to produce output signals in output windings 3. When current $I_c$ flows through interrogating winding 6, its path through inductor 12 creates a magnetic field about such inductor. When transistor 14 returns to its cut-off state due to the termination of turn-on pulse applied to input terminal 22, the collapse of such magnetic field around inductor 12 causes current to flow through such inductor 12 in the same direction that current $I_c$ was flowing through it prior to the termination of driver current. Since such induced current cannot flow through transistor 14, it flows through winding 26, read-in windings 18 and diode 20. Such induced current resets the cores back to their "1" states. Thus, the array of cores 2 can serve as a "1's" generator wherein the generator is reset after each switching of the cores 2 to their respective "0" states. Readout signals are obtained in readout windings 3 either when such cores are switched from their respective "1" states to their respective "0" states, or when all the cores are reset to their respective "1" states. Such choice of readout can be determined by diodes, as was previously mentioned, or by suitable delay circuits.

Figure 2:
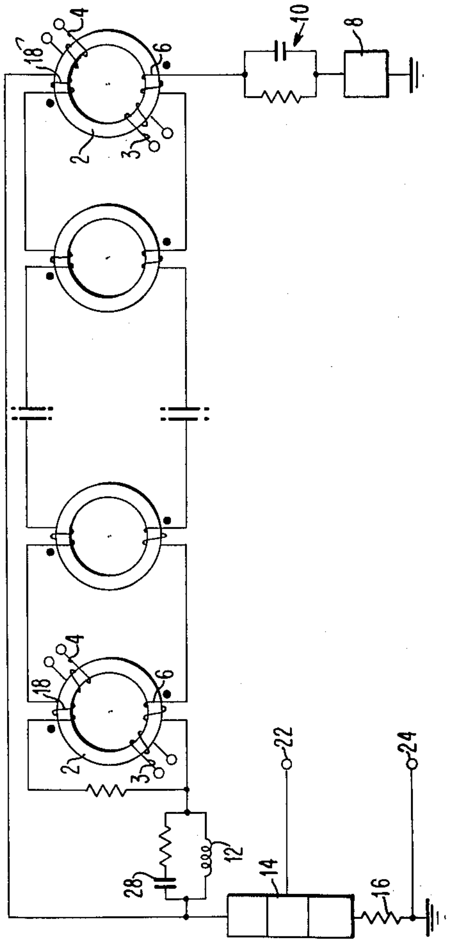
FIG. 2 is a second embodiment of the invention shown in schematic form.

FIGURE 2 is similar to FIGURE 1 save that a capacitor 28 is placed in parallel with inductor 12 so as to form a tank or resonant circuit. In the embodiment shown in FIGURE 2, the parallel resonant circuit formed by inductor 12 and capacitor 28 stores more energy during the delivery of driving current $I_c$ to the cores 2 than the inductor 12 alone does in FIGURE 1. As in FIGURE 1, when the turn-on pulse appearing at input terminal 22 terminates, the tank circuit discharges through windings 18 to reset each of the cores to the same remanent state. Whereas the embodiment of FIGURE 2 has a recovery time that is shorter than the recovery time of the embodiment shown in FIGURE 1, the ratio of the energy delivered to the cores 2 to the energy stored in the tank circuit is low compared to the energy delivered in the embodiment of FIGURE 1. The use of the tank circuit of FIGURE 2 avoids the need of a diode 20.

In summary, the invention described herein obtains a read-out circuit of magnetic cores employing automatic reset of all the cores embodying passive elements in the main wherein the embodiment of FIGURE 1 is used when many cores are to be reset and speed is not essential, and the embodiment of FIGURE 2 is chosen when fewer cores are to be reset and the repetition rate desired is high. The circuit is inherently an amplifying circuit wherein weak signals appearing at terminal 22 appear as amplified signals on output windings 3.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic circuit comprising a plurality of bistable magnetic cores having substantially square loop hysteresis characteristics, a first winding, a second winding, and a third winding on each of said cores, said first winding adapted to receive electrical signals to set its associated core to its first stable state, a series circuit for setting each of said cores to its second stable state including a source of electrical energy, said second windings of each core, an energy storing means, and a transistor, means for triggering said transistor into conduction so as to permit the setting of said cores to their respective second states, and a second series circuit for resetting all said cores to their respective first states upon said transistor returning to its cut-off state, said second series circuit including said energy storing means, a diode, and said third windings.

2. A magnetic circuit comprising a plurality of bistable magnetic cores having substantially square loop hysteresis characteristics, a first winding, a second winding, and a third winding on each of said cores, said first winding adapted to receive electrical signals to set its associated core to its first stable state, a series circuit for setting each of said cores to its second stable state including a source of electrical energy, said second windings of each core, an inductor, and a transistor, and a second series circuit for resetting all said cores to its first stable state including said inductor, a diode, and all said third windings.

3. A magnetic circuit comprising a plurality of bistable magnetic cores having substantially square loop hysteresis characteristics, a first winding, a second winding, and a third winding on each of said cores, each of said first windings adapted to receive electrical signals to set its associated core to its first stable state, a series circuit for setting each of said cores to its second stable state including a source of electrical energy, said second windings of each core, a tank circuit for storing electrical energy, and a transistor, means for triggering said transistor into conduction so as to permit the setting of said cores to their respective second states and also store energy in said tank circuit, and a second series circuit for resetting all said cores to their respective first states upon said transistor returning to its cut-off state, said second series circuit consisting of said energy storng means and said third windings.

References Cited in the file of this patent

UNITED STATES PATENTS 2,749,451 Talambiras ---------------- June 5, 1956
2,847,659 Kaiser ------------------ Aug. 12, 1958
2,897,405 Briggs et al. -------------- July 28, 1959